US008693798B2

(12) United States Patent
Peng et al.

(10) Patent No.: US 8,693,798 B2
(45) Date of Patent: Apr. 8, 2014

(54) IMAGE SHARPNESS PROCESSING APPARATUS AND IMAGE SHARPNESS PROCESSING METHOD

(75) Inventors: Shih-Yuan Peng, New Taipei (TW); Hsin-Te Wang, Nantou County (TW); Chung-Ta Wu, Taichung (TW)

(73) Assignee: Altek Corporation, Hsinchu (TW)

( * ) Notice: Subject to any disclaimer, the term of this patent is extended or adjusted under 35 U.S.C. 154(b) by 121 days.

(21) Appl. No.: 13/470,910

(22) Filed: May 14, 2012

(65) Prior Publication Data

US 2013/0230258 A1    Sep. 5, 2013

(30) Foreign Application Priority Data

Mar. 5, 2012    (TW) .............................. 101107265 A

(51) Int. Cl.
*G06K 9/40*    (2006.01)
*H04N 1/407*    (2006.01)
(52) U.S. Cl.
USPC ......................................... 382/254; 358/3.27
(58) Field of Classification Search
USPC ................. 382/254, 263, 274–275, 305, 312; 358/1.2, 3.26, 3.27, 518, 520, 521, 358/532; 345/589; 348/252
See application file for complete search history.

(56) References Cited

U.S. PATENT DOCUMENTS 5,343,283 A * 8/1994 van Dorsselaer et al. .... 358/445
6,167,414 A * 12/2000 Schwartz ...................... 708/300
7,003,173 B2 * 2/2006 Deshpande ................... 382/261
7,231,072 B2 * 6/2007 Yamano et al. ............... 382/128
7,957,611 B2 * 6/2011 Zhu et al. ...................... 382/300
8,175,411 B2 * 5/2012 Segall ........................... 382/275
8,279,307 B2 * 10/2012 Lin et al. ....................... 348/252
2003/0189579 A1 * 10/2003 Pope ............................. 345/660

OTHER PUBLICATIONS

"The effect of colour space on image sharpening algorithms" Michael Wirth and Denis Nikitenko; IEEE, 2010, pp. 79-85.*

* cited by examiner

*Primary Examiner* — Kanjibhai Patel
(74) *Attorney, Agent, or Firm* — Muncy, Geissler, Olds & Lowe, P.C.

(57) ABSTRACT

The present invention discloses an image sharpness processing apparatus and an image sharpness processing method thereof. The apparatus comprises an image capturing module and a processing module. The image capturing module captures an image having a plurality of pixels. The processing module gains a characteristic value corresponding to each pixel by analyzing each pixel in the image. The processing module calculates a first sharpening compensation value and a second sharpening compensation value of each pixel by using a first sharpening algorithm and a second sharpening algorithm respectively, and determines a weight value of the first sharpening algorithm and the second sharpening algorithm by the characteristic value. The processing module calculates a third sharpening compensation value according to the first sharpening compensation value and the second sharpening compensation value, so as to adjust the sharpness of the image.

9 Claims, 7 Drawing Sheets

IMAGE SHARPNESS PROCESSING APPARATUS AND IMAGE SHARPNESS PROCESSING METHOD

CROSS-REFERENCE TO RELATED APPLICATION

This application claims the benefit of Taiwan Patent Application No. 101107265, filed on Mar. 5, 2012, in the Taiwan Intellectual Property Office, the disclosure of which is incorporated herein in its entirety by reference.

BACKGROUND OF THE INVENTION

1. Field of the Invention

The present invention relates to an image processing apparatus and an image processing method, and more particularly to the image sharpness processing apparatus and the method that combine two different image sharpening methods to enhance the quality of the image sharpness.

2. Description of the Related Art

The sharpness of digital images captured by various different optical devices such as cameras and scanners may be lowered due to different factors including a poor design of the optical devices, an erroneous digital image processing, or a shaking of the camera occurred during the process of capturing an image. Therefore, the digital images require sharpening process to enhance the sharpness of the image, wherein the conventional image sharpening method includes an unsharp masking or a fuzzy-based image sharpening method.

However, the conventional image sharpening method simply uses the unsharp masking or fuzzy-based image sharpening method only. If only the unsharp masking image sharpening method is used, discrete high-frequency signals will be generated at the edge of the object in the image, and we cannot distinguish the edge of the image from noises. Although this conventional image sharpening method can improve the sharpness of the image, yet the noise in the image is also amplified, so that the overall image quality will drop. If only the fuzzy-based image sharpening method is used, the tiny texture area in the image will be damaged, so that the content of the image tends to have the characteristics of an oil painting.

SUMMARY OF THE INVENTION

In view of the aforementioned problems of the prior art, it is a primary objective of the invention to provide an image sharpness processing apparatus and an image sharpness processing method that combine two different image sharpening methods to improve the quality of the image sharpness, so as to overcome the deficiencies of the conventional image processing method that only uses one image sharpening method to improve the sharpness of the image and results in producing more noises after the sharpness of the image is improved or the fine texture area in the image is damaged, so that the content of the image tends to have the characteristics of an oil painting.

To achieve the foregoing object, the present invention provides an image sharpness processing apparatus, comprising an image capturing module and a processing module. The image capturing module captures an image having a plurality of pixels. The processing module analyzes each of the pixels of the image to obtain a characteristic value corresponding to each of the pixels, and the processing module uses a first sharpening algorithm and a second sharpening algorithm to calculate a first sharpening compensation value and a second sharpening compensation value corresponding to each of the pixels respectively and uses the characteristic value to determine a weight value of the first sharpening algorithm and the second sharpening algorithm, and the processing module calculates a third sharpening compensation value according to the first sharpening compensation value, the second sharpening compensation value and the weight value, and uses the plurality of third sharpening compensation values to adjust the sharpness of the image.

Preferably, the processing module uses the characteristic value to determine the weight value according to a specific curve.

Preferably, the weight value further comprises a first weight value, a second weight value and a predetermined total weight value, and the abscissa of the specific curve is a numerical value of the characteristic value, and the ordinate of the specific curve is the first weight value of the first sharpening algorithm, and the processing module obtains the first weight value according to a position on the specific curve corresponding to the characteristic value, and further obtains the second weight value of the second sharpening algorithm according to the first weight value and the predetermined total weight value.

Preferably, the processing module multiplies the first sharpening compensation value by the first weight value and multiplies the second sharpening compensation value by the second weight value, and then adds two products to obtain the third sharpening compensation value.

Preferably, the first sharpening algorithm is based on a fuzzy theory and the second sharpening algorithm is an unsharp masking.

To achieve the foregoing objective, the present invention further provides an image sharpness processing method comprising the steps of providing an image capturing module to capture an image having a plurality of pixels; using a processing module to analyze each of the pixels of the image to obtain a characteristic value corresponding to each of the pixels; using a first sharpening algorithm and a second sharpening algorithm to calculate a first sharpening compensation value and a second sharpening compensation value corresponding to each of the pixels by the processing module; using the characteristic value to determine a weight value of the first sharpening algorithm and the second sharpening algorithm; using the processing module to calculate a third sharpening compensation value according to the first sharpening compensation value, the second sharpening compensation value and the weight value; and using the third sharpening compensation values to adjust the sharpness of the image.

Preferably, the processing module uses the characteristic value to determine the weight value according to a specific curve.

Preferably, the weight value further comprises a first weight value, a second weight value and a predetermined total weight value, and the abscissa of the specific curve is a numerical value of the characteristic value, and the ordinate of the specific curve is the first weight value of the first sharpening algorithm, and the image processing method further comprises the steps of using the processing module to obtain the second weight value of the second sharpening algorithm according to the first weight value on the specific curve corresponding to the characteristic value.

Preferably, the image sharpness processing method further comprises the steps of multiplying the first sharpening compensation value by the first weight value, multiplying the second sharpening compensation value by the second weight value, and then adding the two products to obtain the third sharpening compensation value by the processing module.

Preferably, the first sharpening algorithm is based on a fuzzy theory and the second sharpening algorithm is an unsharp masking.

To achieve the foregoing objective, the present invention further provides an image sharpness processing apparatus, comprising: an image capturing module, for capturing an image having a plurality of pixels; a processing module, for analyzing each of the pixels of the image to obtain a characteristic value corresponding to each of the pixels, using a first sharpening algorithm and a second sharpening algorithm to calculate a first sharpening compensation value and a second sharpening compensation value corresponding to each of the pixels by the processing module, using the characteristic value to determine a weight value of the first sharpening algorithm and the second sharpening algorithm, using the processing module to calculate a third sharpening compensation value according to the first sharpening compensation value, the second sharpening compensation value and the weight value; and an image adjusting module, for using the third sharpening compensation values to adjust the sharpness of the image.

Preferably, the processing module uses the characteristic value to determine the weight value according to a specific curve.

Preferably, the weight value further comprises a first weight value, a second weight value and a predetermined total weight value, and the abscissa of the specific curve is a numerical value of the characteristic value, and the ordinate of the specific curve is the first weight value of the first sharpening algorithm, and the image processing apparatus further uses the processing module to obtain a first weight value of the first sharpening algorithm according to a position on the specific curve corresponding to the characteristic value and further obtain the second weight value of the second sharpening algorithm according to the first weight value and the predetermined total weight value.

Preferably, the processing module multiplies the first sharpening compensation value by the first weight value, multiplies the second sharpening compensation value by the second weight value, and adds the two products to obtain the third sharpening compensation value.

Preferably, the first sharpening algorithm is based on a fuzzy theory and the second sharpening algorithm is an unsharp masking.

In summary, the image sharpness processing apparatus and method of the present invention have the following advantage:

The image sharpness processing apparatus and method of the present invention combines two different image sharpening methods to adjust the sharpness of an image so as to improve the quality of the sharpness of the image and also overcome the problems of the conventional image processing method that simply uses an image sharpening method to improve the sharpness of the image, and thus generating discrete high-frequency signals at edges of an object in the image, producing more noises after the sharpness of the image is improved, or damaging the fine texture area in the image to result in a content of the image that tends to have the characteristics of an oil painting.

DETAILED DESCRIPTION OF THE PREFERRED EMBODIMENTS

The technical contents and characteristics of the present invention will be clear with the detailed description of a preferred embodiment accompanied with related drawings as follows. For simplicity, same numerals are used in the following preferred embodiment to represent respective same elements.

Figure 1:
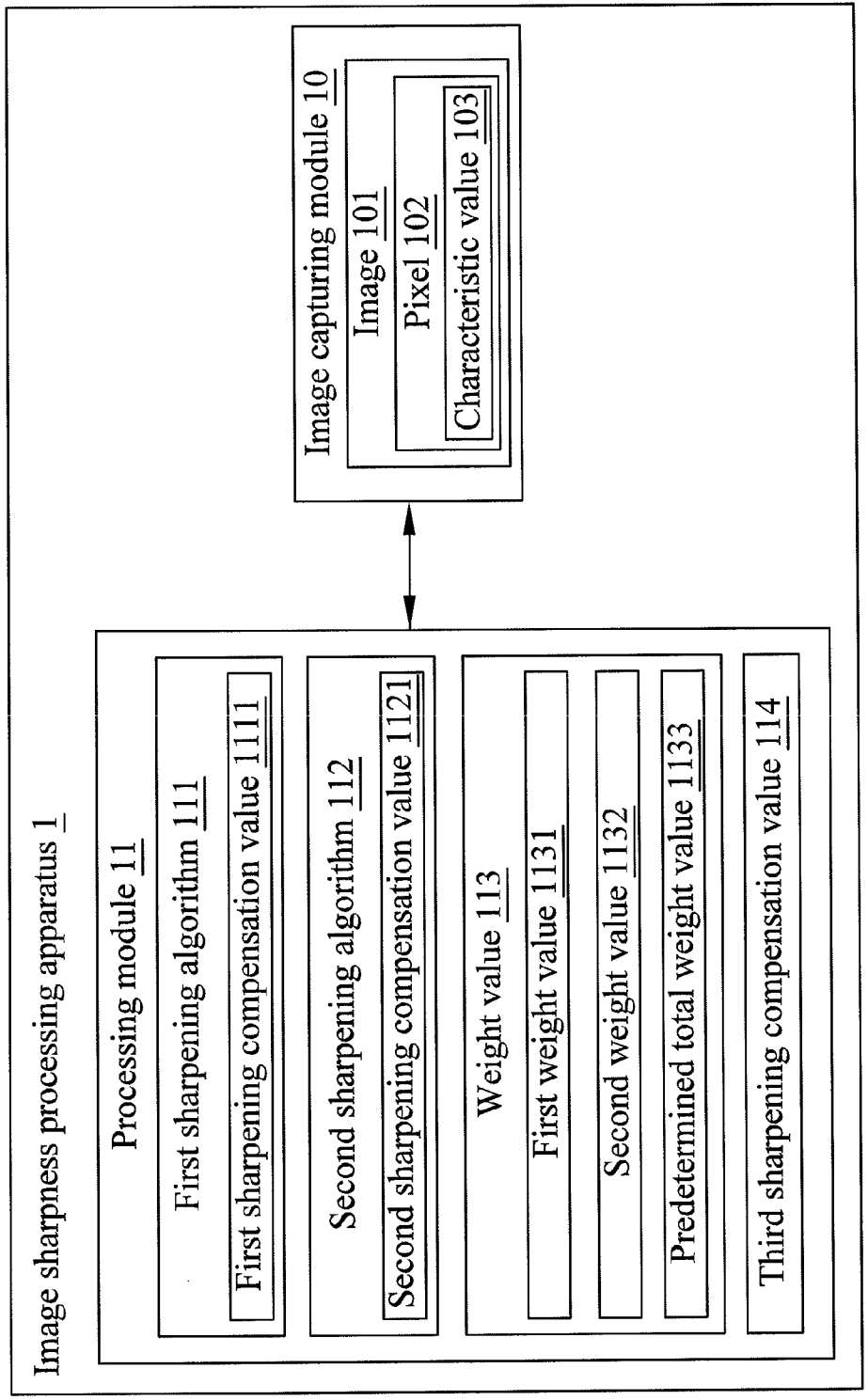
FIG. 1 is a first block diagram of an image sharpness processing apparatus in accordance with a first preferred embodiment of the present invention.
Figure 2:
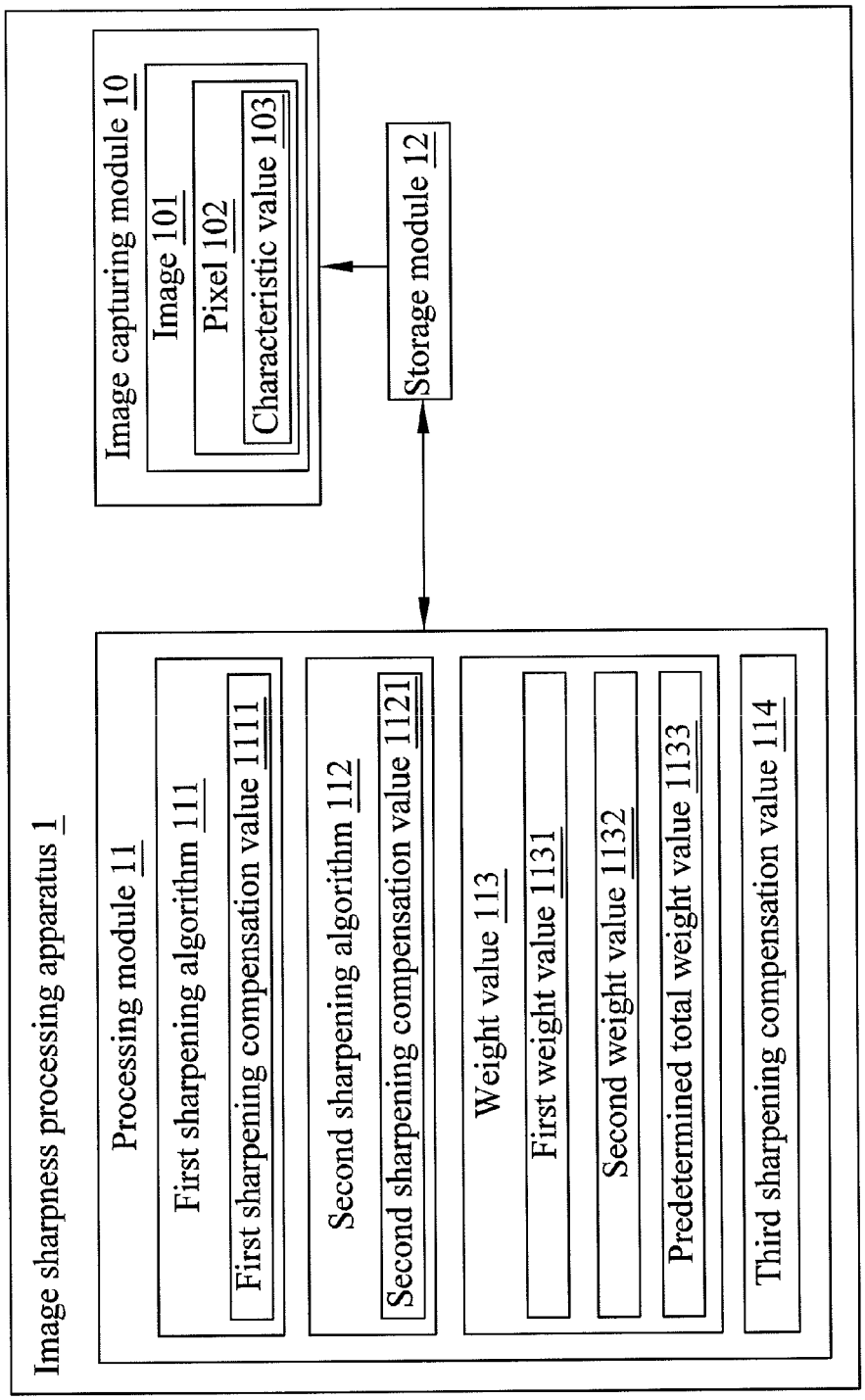
FIG. 2 is a second block diagram of an image sharpness processing apparatus in accordance with the first preferred embodiment of the present invention.

With reference to FIGS. 1 and 2 for the first and second block diagrams of an image sharpness processing apparatus in accordance with a first preferred embodiment of the present invention respectively, the image sharpness processing apparatus 1 comprises an image capturing module 10 and a processing module 11. The image capturing module 10 includes a camera lens, a photo sensor such as a complementary metal oxide semiconductor (CMOS) sensor, a charge coupled device (CCD), an analog/digital circuit, and an image processing unit. The image capturing module 10 captures an image 101 having a plurality of pixels 102.

The processing module 11 is electrically coupled to the image capturing module 10 for analyzing each pixel 102 of the image 101 to obtain a characteristic value 103 corresponding to each pixel 102. The processing module 11 uses a first sharpening algorithm 111 and a second sharpening algorithm 112 to calculate a first sharpening compensation value 1111 and a second sharpening compensation value 1121 corresponding to each pixel 102 and uses the characteristic value 103 to determine a weight value 113 of the first sharpening algorithm 111 and the second sharpening algorithm 112. The processing module 11 calculates a third sharpening compensation value 114 according to the first sharpening compensation value 1111, the second sharpening compensation value 1121 and the weight value 113, and uses the plurality of third sharpening compensation values 114 to adjust the sharpness of the image 101. Wherein, the weight value 113 preferably further comprises a first weight value 1131, a second weight value 1132 and a predetermined total weight value 1133.

Preferably, the image sharpness processing apparatus 1 further comprises a storage module 12 electrically coupled to the image capturing module 10 and the processing module 11, and the storage module 12 is provided for storing the image 101 captured by the image capturing module 10 and provided for the processing module 11 to access the image 101.

In the description above, the characteristic value 103 is preferred an area characteristic of the pixels, wherein the area characteristic preferably includes a flat area, a texture area, and a hard boundary area.

Figure 3:
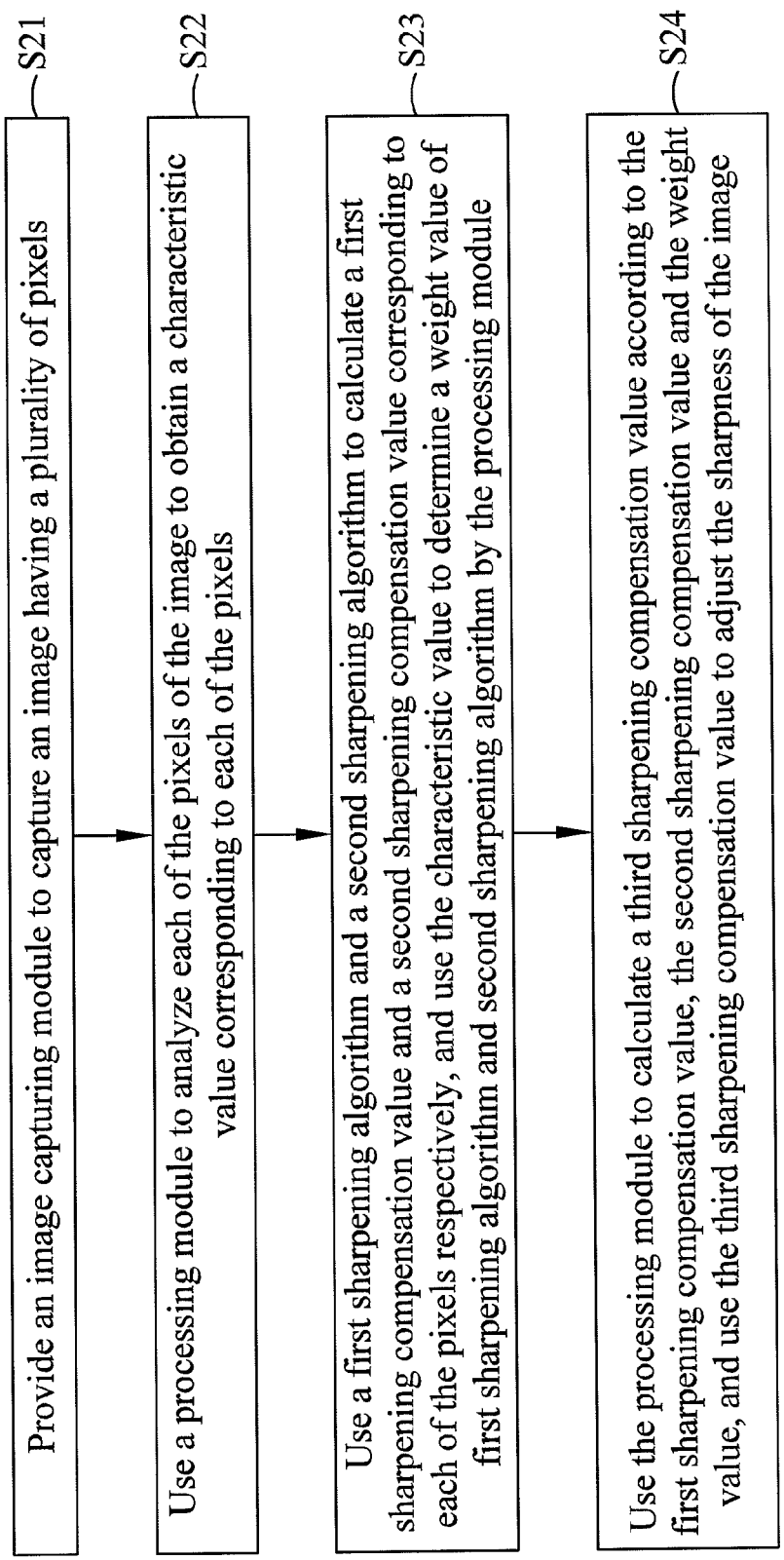
FIG. 3 is a flow chart of an image sharpness processing method in accordance with the first preferred embodiment of the present invention.

With reference to FIG. 3 for a flow chart of an image sharpness processing method in accordance with the first preferred embodiment of the present invention together with FIG. 1, the image sharpness processing method is applied in an image sharpness processing apparatus, and the image sharpness processing apparatus comprises an image capturing module and a processing module. The image sharpness processing method comprises the following steps:

S21: Provide an image capturing module to capture an image having a plurality of pixels.

S22: Use a processing module to analyze each of the pixels of the image to obtain a characteristic value corresponding to each of the pixels.

S23: Use a first sharpening algorithm and a second sharpening algorithm to calculate a first sharpening compensation value and a second sharpening compensation value corresponding to each of the pixels respectively, and use the characteristic value to determine a weight value of first sharpening algorithm and second sharpening algorithm by the processing module.

S24: Use the processing module to calculate a third sharpening compensation value according to the first sharpening compensation value, the second sharpening compensation value and the weight value, and use the plurality of third sharpening compensation values to adjust the sharpness of the image.

The step S23 preferably comprises the following steps:

The processing module obtains a second weight value of a second sharpening algorithm according to the first weight value on a specific curve corresponding to the characteristic value.

The step S24 preferably comprises the following steps:

The processing module multiples the first sharpening compensation value by the first weight value, and multiples the second sharpening compensation value by the second weight value, and then adds the two products to obtain a third sharpening compensation value.

Figure 4:
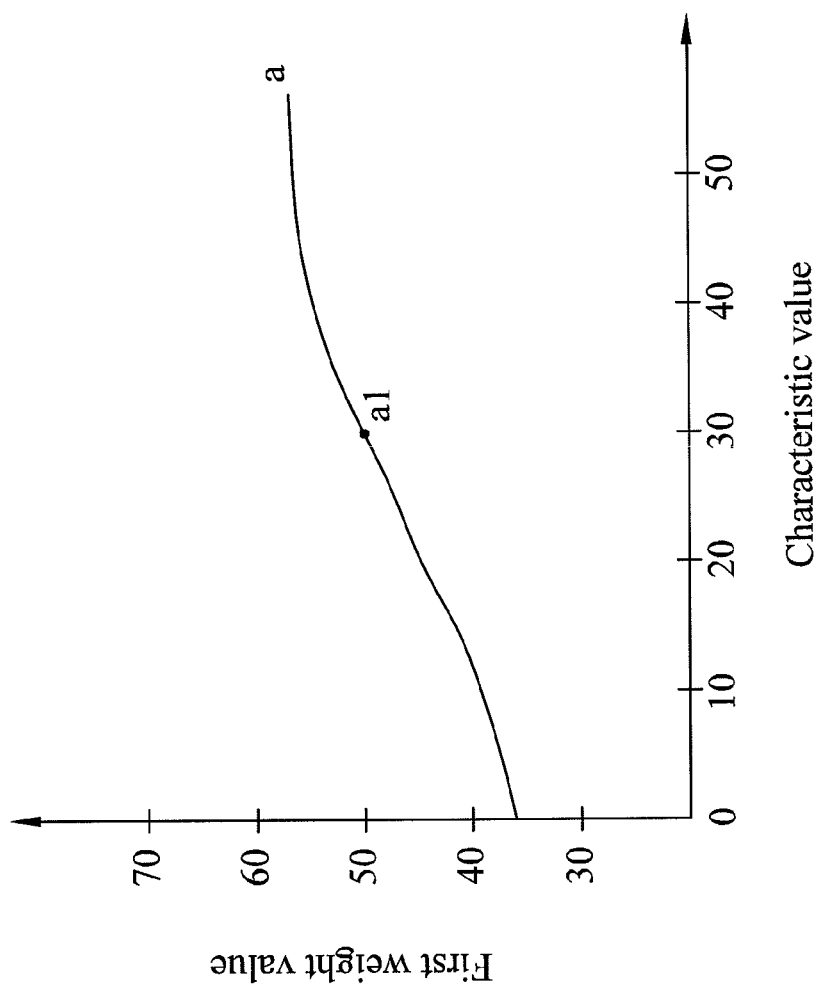
FIG. 4 is a curve diagram of an image sharpness processing method in accordance with the first preferred embodiment of the present invention.

With reference to FIG. 4 for a curve diagram of an image sharpness processing method in accordance with the first preferred embodiment of the present invention, the processing module 11 further uses a characteristic value 103 to determine a weight value 113 according to a specific curve a. Preferably, the abscissa of the specific curve a is the numerical value of the characteristic value 103, and the ordinate of the specific curve a is the first weight value 1131 of the first sharpening algorithm 111.

More specifically, the processing module 11 obtains the first weight value 1131 according to a position al on a specific curve a corresponding to the characteristic value 103, and further obtains the second weight value 1132 of the second sharpening algorithm 112 according to the first weight value 1131 and the predetermined total weight value 1133. The processing module 11 multiplies the first sharpening compensation value 1111 by the first weight value 1131, and multiplies the second sharpening compensation value 1121 by the second weight value 1132, and then adds the two products to obtain a third sharpening compensation value 114.

For example, the image capturing module 10 takes a scene to capture an image 101 (hereinafter referred to as "scene image"). Now, the processing module 11 reads the scene image and analyzes the plurality of pixels 102 in the scene image to obtain a characteristic value 103 corresponding to each of the pixels 102. In the meantime, the processing module 11 uses a first sharpening algorithm 111 and a second sharpening algorithm 112 to calculate a first sharpening compensation value 1111 and a second sharpening compensation value 1121 of each of the pixels 102 respectively.

The processing module 11 maps the obtained numerical value of each characteristic value 103 according to the numerical value of the abscissa of a specific curve a (for example, the numerical value of the first characteristic value obtained by the processing module 11 is equal to 30). The processing module 11 further maps a position on the specific curve a (for example, the numerical value 30 of the abscissa maps to a position on the specific curve a, and such position is the position a1). Each characteristic value 103 corresponding to a position on the specific curve is mapped to the numerical value of the ordinate of the specific curve a (for example, the position al corresponding to the numerical value on the ordinate, and the numerical value is equal to 50). Therefore, the numerical value of the first weight value 1131 of each characteristic value 103 can be obtained. For example, the numerical value of the first weight value corresponding to the first characteristic value is equal to 50. The processing module 11 subtracts each first weight value 1131 from the predetermined total weight value 1133 to obtain a plurality of second weight values 1132. For example, the numerical value of the predetermined total weight value 1133 of the processing module 11 is equal to 128, so that after the processing module subtracts 50 form 128, the obtained numerical value is equal to 70. In other words, the numerical value of the second weight value 1132 is equal to 70.

And then, the processing module 11 bases on the obtained first sharpening compensation value 1111, second sharpening compensation value 1121, first weight value 1131 and second weight value 1132 of each characteristic value 10 to multiply the first sharpening compensation value 1111 of each characteristic value 103 by the first weight value 1131, and multiply the second sharpening compensation value 1121 by the second weight value 1132, and adds the numerical values of the two products to obtain a third sharpening compensation value 114 corresponding to each characteristic value 103. The processing module 11 further adjust the sharpness of the scene image according to the plurality of third sharpening compensation values 114, so as to improve the quality of sharpening the scene image. Wherein, the third sharpening compensation value 114 can be calculated by the equation given below:

$$V=(O+U)*(W-F)+B*F$$

Where, V is the third sharpening compensation value, O is the characteristic value, U is a signal of the second sharpening algorithm, W is the predetermined total weight value, B is the first sharpening compensation value, and F is the first weight value. After the characteristic value and the signal of the second sharpening algorithm are added to obtain the second sharpening compensation value, and the predetermined total weight value subtracts the first weight value to obtain the second weight value.

Figure 5:
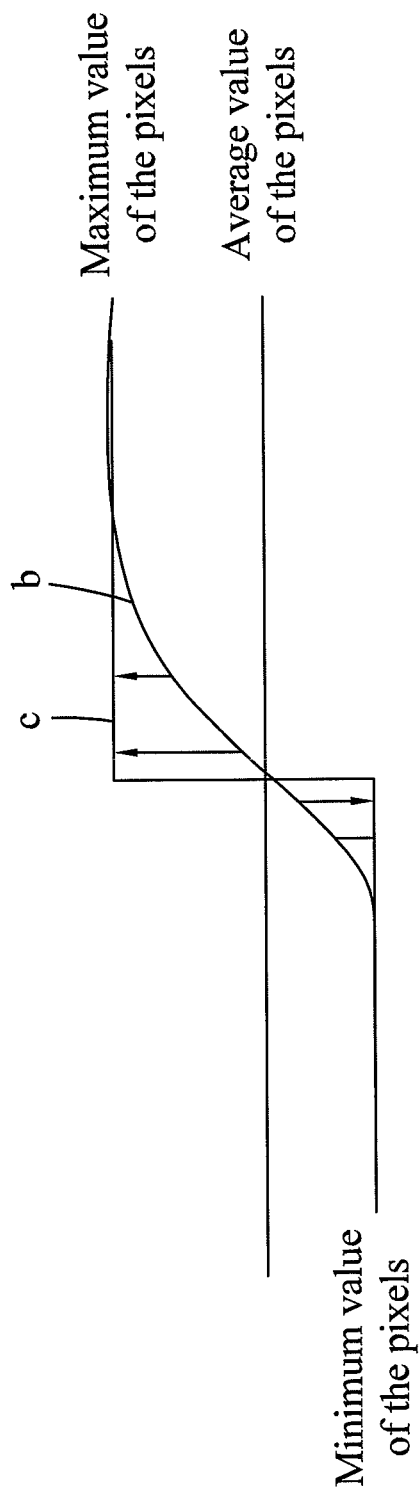
FIG. 5 is a waveform diagram of an image sharpness processing method in accordance with the first preferred embodiment of the present invention.

With reference to FIG. 5 for a waveform diagram of an image sharpness processing method in accordance with the first preferred embodiment of the present invention together with FIGS. 1 and 3, the image capturing module 10 takes a scene to capture an image 101 (hereinafter referred to as the "scene image"). Now, if the processing module 11 intends to use the first sharpening algorithm 111 to adjust the scene image, the processing module 11 will read the scene image first and then analyze a plurality of pixels 102 of the scene image to obtain an area characteristic and characteristic value 103 of each pixel 102. However, the processing module 11 selects a mask for each area characteristic, and selects the maximum value of the pixel and the minimum value of the pixel from the numerical values of the plurality of pixels within the mask, and then obtains an average value of the pixel according to the maximum value of the pixel and the minimum value of the pixel. Wherein, the average value of the pixel can be calculated by the equation given below:

Average value of the pixel=(Maximum value of the pixel+Minimum value of the pixel)/2

And then, the processing module 11 subtracts the characteristic value 103 from the average value of the pixel, and the variance of the absolute value of a pixel and the center point of the mask. If the characteristic value 103 is greater than the average value of the pixel, then the processing module 11 will add a predetermined specific value to the characteristic value 103, so that the characteristic value 103 approaches the maximum value of the pixel. If the characteristic value 103 is smaller than the average value of the pixel, then the processing module 11 will subtract a predetermined specific value from the characteristic value 103, so that the characteristic value 103 approaches the minimum value of the pixel, and the maximum and minimum values of the pixel are used for adjusting the scene image, such that the numerical value of each characteristic value 103 in the scene image having a curved wave b which is changed to a square wave c, and the scene image will not over-adjust the image. Wherein, the processing module 11 obtains the predetermined specific value according to the numerical values listed in Table 1.

TABLE 1

| Variance of Absolute Values of Pixel and Central Point of Mask | Predetermined Specific Value |
| --- | --- |
| 0 | 0 |
| 4 | 2 |
| 8 | 4 |
| 12 | 8 |
| 16 | 12 |
| 20 | 16 |
| 24 | 20 |

In the foregoing preferred embodiment, the first sharpening algorithm 111 is preferably based on a fuzzy theory and the second sharpening algorithm 112 is preferably an unsharp masking.

It is noteworthy to point out that the foregoing preferred embodiments are provided as examples for illustrating the present invention, but not intended for limiting the scope of the present invention.

Figure 6:
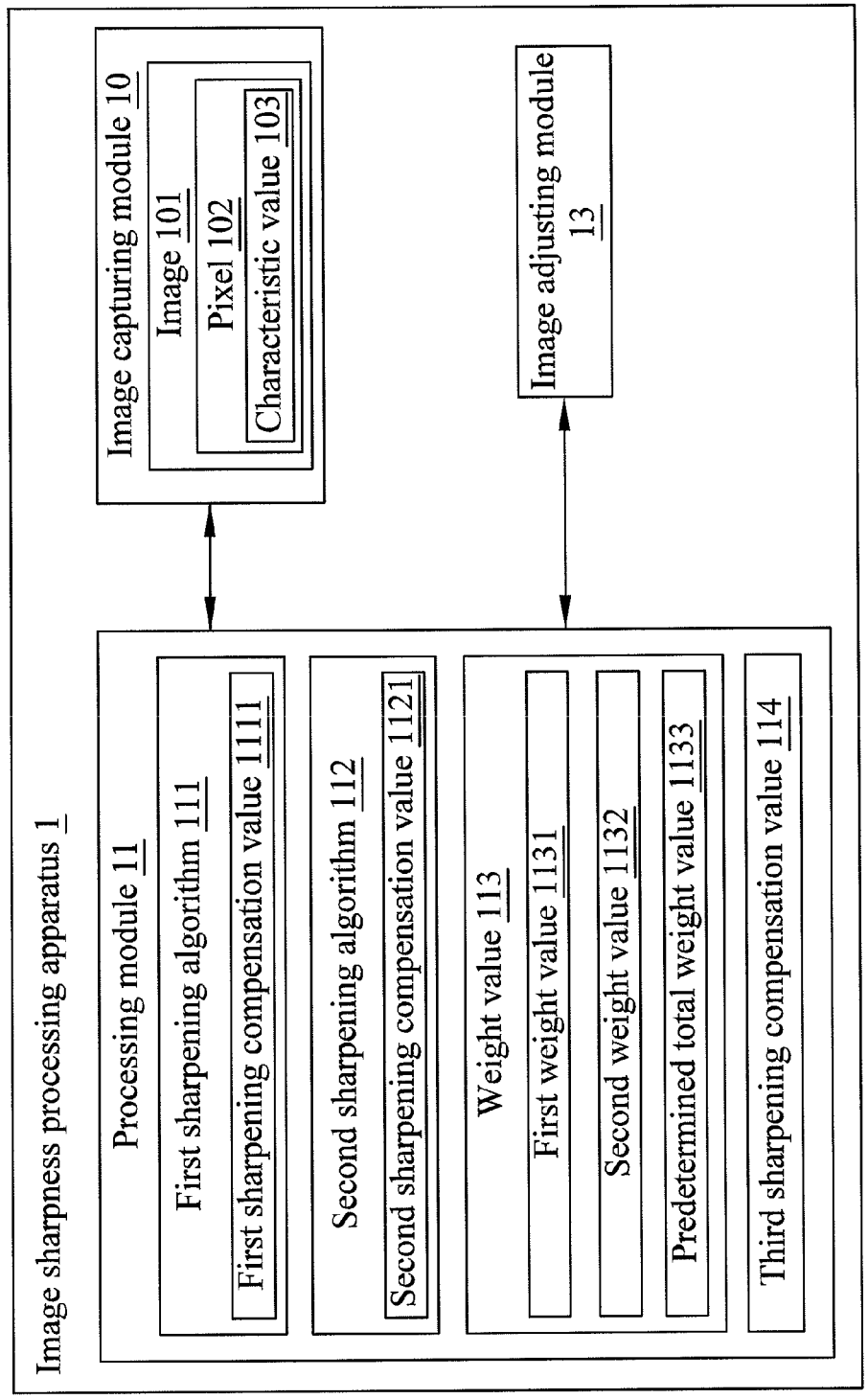
FIG. 6 is a block diagram of an image sharpness processing apparatus in accordance with a second preferred embodiment of the present invention.

With reference to FIG. 6 for a block diagram of an image sharpness processing apparatus in accordance with a second preferred embodiment of the present invention, the image sharpness processing apparatus 1 comprises an image capturing module 10, a processing module 11 and an image adjusting module 13, and their operations are similar to those of the same elements in the first preferred embodiment, and thus will not be repeated. However, it is noteworthy to point out that the second preferred embodiment further comprises an image adjusting module 13, when compared with the first preferred embodiment. In the second preferred embodiment, the image adjusting module 13 is electrically coupled to the processing module 11, such that after the processing module 11 calculates a third sharpening compensation value 114 according to the first sharpening compensation value 1111, the second sharpening compensation value 1121, the first weight value 1131 and the second weight value 1132, the image adjusting module 13 can use the plurality of third sharpening compensation values 114 to adjust the image 101, so as to improve the quality of sharpening the image 101.

Figure 7:
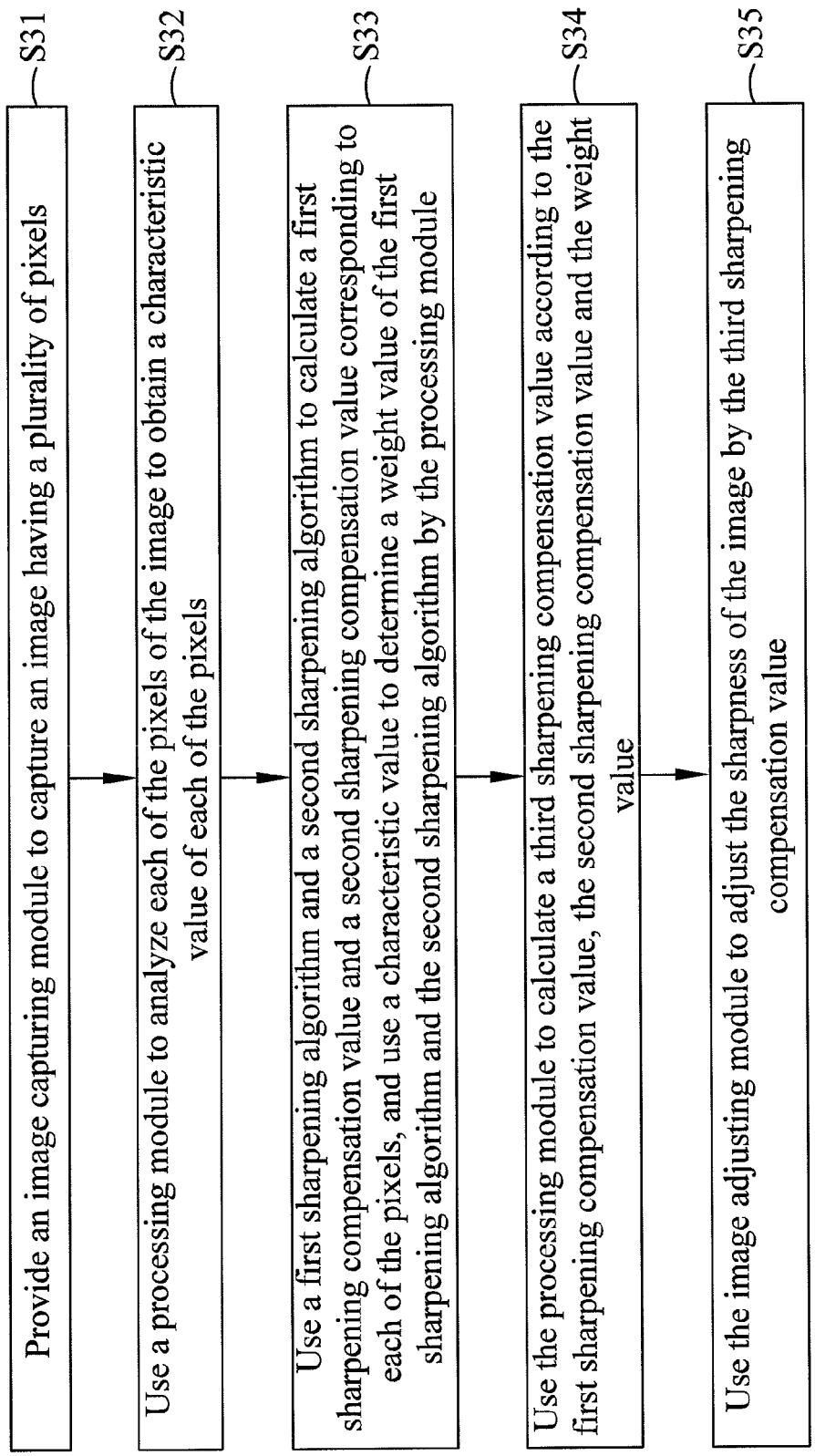
FIG. 7 is a flow chart of an image sharpness processing method in accordance with the second preferred embodiment of the present invention.

With reference to FIG. 7 for a flow chart of an image sharpness processing method in accordance with the second preferred embodiment of the present invention, the image sharpness processing method of this preferred embodiment comprises the steps similar to those of the first preferred embodiment, and thus will not be repeated. However, it is noteworthy to point out that the image sharpness processing apparatus of this preferred embodiment further comprises an image adjusting module, and the method comprises the following steps:

S31: Provide an image capturing module to capture an image having a plurality of pixels.

S32: Use a processing module to analyze each of the pixels of the image to obtain a characteristic value of each of the pixels.

S33: Use a first sharpening algorithm and a second sharpening algorithm to calculate a first sharpening compensation value and a second sharpening compensation value corresponding to each of the pixels, and use a characteristic value to determine a weight value of the first sharpening algorithm and the second sharpening algorithm by the processing module.

S34: Use the processing module to calculate a third sharpening compensation value according to the first sharpening compensation value, the second sharpening compensation value and the weight value.

S35: Use the image adjusting module to adjust the sharpness of the image by the plurality of third sharpening compensation values.

In each of the foregoing preferred embodiments, the first sharpening algorithm is preferably based on a fuzzy theory and the second sharpening algorithm is preferably an unsharp masking.

It is noteworthy to point out that the foregoing preferred embodiments are provided for the purpose of illustrating the present invention only, but not intended for limiting the scope of the invention, and the invention is not limited to these embodiments in its practical implementation.

In summary, the image sharpness processing apparatus and method of the present invention can combine two different image sharpening methods to improve the quality of the image sharpness, so as to overcome the deficiencies of the conventional image processing method that only uses one image sharpening method to improve the sharpness of the image and results in producing more noises after the sharpness of the image is improved or the fine texture area in the image is damaged, so that the content of the image tends to have the characteristics of an oil painting. The present invention not only improves the quality of sharpening the image, but also allows the image to be applied in different kinds of pixel variations.

What is claimed is:

1. An image sharpness processing apparatus, comprising:
an image capturing module, arranged for capturing an image having a plurality of pixels; and
a processing module, arranged for analyzing each of the pixels of the image to obtain a characteristic value corresponding to each of the pixels, using a first sharpening algorithm and a second sharpening algorithm to calculate respectively a first sharpening compensation value and a second sharpening compensation value corresponding to each of the pixels, using the characteristic value to determine a weight value of the first sharpening algorithm and the second sharpening algorithm, calculating a third sharpening compensation value according to the first sharpening compensation value, the second sharpening compensation value and the weight value, and using the third sharpening compensation value to adjust the sharpness of the image;

wherein the processing module uses the characteristic value to determine the weight value according to a specific curve; and wherein the weight value further comprises a first weight value, a second weight value and a predetermined total weight value, and an abscissa of the specific curve is a numerical value of the characteristic value, and an ordinate of the specific curve is the first weight value of the first sharpening algorithm, and the processing module obtains the first weight value according to a position on the specific curve corresponding to the characteristic value, and further obtains the second weight value of the second sharpening algorithm according to the first weight value and the predetermined total weight value.

2. The image sharpness processing apparatus of claim 1, wherein the processing module adds a product from multiplying the first sharpening compensation value by the first weight value, and a product from multiplying the second sharpening compensation value by the second weight value to obtain the third sharpening compensation value.

3. The image sharpness processing apparatus of claim 1, wherein the first sharpening algorithm is based on a fuzzy theory and the second sharpening algorithm is an unsharp masking.

4. An image sharpness processing method, comprising steps of:
providing an image capturing module to capture an image having a plurality of pixels;
using a processing module to analyze each of the pixels of the image to obtain a characteristic value corresponding to each of the pixels;
using a first sharpening algorithm and a second sharpening algorithm to calculate respectively a first sharpening compensation value and a second sharpening compensation value corresponding to each of the pixels by the processing module;
using the characteristic value to determine a weight value of the first sharpening algorithm and the second sharpening algorithm;
using the processing module to calculate a third sharpening compensation value according to the first sharpening compensation value, the second sharpening compensation value and the weight value; and
using the third sharpening compensation value to adjust the sharpness of the image;
wherein the processing module uses the characteristic value to determine the weight value according to a specific curve; and
wherein the weight value further comprises a first weight value, a second weight value and a predetermined total weight value, and an abscissa of the specific curve is a numerical value of the characteristic value, and an ordinate of the specific curve is the first weight value of the first sharpening algorithm, and the image processing method further comprises the steps of using the processing module to obtain the second weight value of the second sharpening algorithm according to the first weight value on the specific curve corresponding to the characteristic value.

5. The image sharpness processing method of claim 4, further comprising steps of adding a product from multiplying the first sharpening compensation value by the first weight value, and a product from multiplying the second sharpening compensation value by the second weight value to obtain the third sharpening compensation value by the processing module.

6. The image sharpness processing method of claim 4, wherein the first sharpening algorithm is based on a fuzzy theory and the second sharpening algorithm is an unsharp masking.

7. An image sharpness processing apparatus, comprising:
an image capturing module, arranged for capturing an image having a plurality of pixels;
a processing module, arranged for analyzing each of the pixels of the image to obtain a characteristic value corresponding to each of the pixels, using a first sharpening algorithm and a second sharpening algorithm to calculate respectively a first sharpening compensation value and a second sharpening compensation value corresponding to each of the pixels by the processing module, using the characteristic value to determine a weight value of the first sharpening algorithm and the second sharpening algorithm, using the processing module to calculate a third sharpening compensation value according to the first sharpening compensation value, the second sharpening compensation value and the weight value; and
an image adjusting module, arranged for using the third sharpening compensation value to adjust the sharpness of the image;
wherein the processing module uses the characteristic value to determine the weight value according to a specific curve;
wherein the weight value further comprises a first weight value, a second weight value and a predetermined total weight value, and an abscissa of the specific curve is a numerical value of the characteristic value, and an ordinate of the specific curve is the first weight value of the first sharpening algorithm, and the image processing apparatus further uses the processing module to obtain the first weight value of the first sharpening algorithm according to a position on the specific curve corresponding to the characteristic value and further obtain the second weight value of the second sharpening algorithm according to the first weight value and the predetermined total weight value.

8. The image sharpness processing apparatus of claim 7, wherein the processing module adds a product from multiplying the first sharpening compensation value by the first weight value, and a product from multiplying the second sharpening compensation value by the second weight value to obtain the third sharpening compensation value.

9. The image sharpness processing apparatus of claim 7, wherein the first sharpening algorithm is based on a fuzzy theory and the second sharpening algorithm is an unsharp masking.

* * * * *